United States Patent [19]

Kim et al.

[11] Patent Number: 4,966,710

[45] Date of Patent: Oct. 30, 1990

[54] METHOD FOR REMOVING MAGNESIUM AND CALCIUM FROM SODIUM SULFATE SOLUTIONS

[75] Inventors: Tai K. Kim, Towanda; Robert P. McClintic, Monroeton, both of Pa.

[73] Assignee: GTE Products Corporation, Stamford, Conn.

[21] Appl. No.: 504,476

[22] Filed: Apr. 4, 1990

[51] Int. Cl.$^5$ ............................................. B01D 15/04
[52] U.S. Cl. ................... 210/665; 210/669; 210/687; 432/157; 432/164; 432/181
[58] Field of Search .............. 210/665, 669, 687; 423/157, 164, 181

[56] References Cited

U.S. PATENT DOCUMENTS 4,060,465 11/1977 Yokota et al. ................ 210/687
4,855,059 8/1989 Frianeza-Kullberg ........... 423/181

Primary Examiner—Ivars Cintins
Attorney, Agent, or Firm—L. Rita Quatrini; Robert E. Walter

[57] ABSTRACT

A method for removing magnesium and calcium from sodium sulfate solutions to render the solutions suitable for membrane processing, which comprises adjusting the pH of the solutions to about 11 to 13 with sodium hydroxide to form a precipitate containing the bulk of the magnesium and the calcium, removing the precipitate from the resulting partially purified sodium sulfate solution, and contacting the partially purified sodium sulfate solution with a polystyrene divinyl benzene copolymer chelating cation exchange resin having an aminophosphonic functional group and having sodium as the exchangeable cation, to remove essentially all of the magnesium and the calcium from the partially purified sodium sulfate solution.

2 Claims, No Drawings

METHOD FOR REMOVING MAGNESIUM AND CALCIUM FROM SODIUM SULFATE SOLUTIONS

BACKGROUND OF THE INVENTION

This invention relates to a method for essentially completely removing magnesium and calcium from sodium sulfate solutions by a method in which the pH is controlled, to remove the bulk of the magnesium and calcium by precipitation followed by use of a cation exchange technique to remove the balance of the magnesium and calcium. This method renders the solutions suitable for ion membrane processing.

Sodium sulfate solutions are generated as raffinates from the solvent extraction of tungsten in liquid-liquid extraction systems. These solutions present a waste removal problem. These solutions can be processed by membrane technology to recover sodium hydroxide and sulfuric acid which are usable products. This process avoids production of a waste stream. In ion membrane technology, a cell using ion membranes is used. This cell is a critical part of the process and requires the use of purified solutions. Otherwise, magnesium and calcium ions precipitate as insoluble hydroxides and plug up membrane holes, rendering them inoperative.

It is advantageous therefore to purify these solutions so that they can be processed to recover reagent materials.

SUMMARY OF THE INVENTION

In accordance with one aspect of the invention, there is provided a method for removing magnesium and calcium from sodium sulfate solutions to render the solutions suitable for membrane processing, which comprises adjusting the pH of the solutions to about 11 to 13 with sodium hydroxide to form a precipitate containing the bulk of the magnesium and the calcium, removing the precipitate from the resulting partially purified sodium sulfate solution, and contacting the partially purified sodium sulfate solution with a polystyrene divinyl benzene copolymer chelating cation exchange resin having an aminophosphonic functional group and having sodium as the exchangeable cation, to remove essentially all of the magnesium and the calcium from the partially purified sodium sulfate solution.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The present invention provides a method for purifying sodium sulfate solutions of magnesium and calcium. The pH of the starting solution is adjusted so that the bulk of the magnesium and calcium are first removed. The remainder of the magnesium and calcium are removed by contacting the partially purified solution with a chelating cation exchange resin. The advantage of the method of the present invention is that since the bulk of the calcium and magnesium are first removed, more sodium sulfate solution can be treated by the resin because the frequency of regeneration of the resin is reduced. Also the use of chemicals in regeneration is reduced. The resulting purified solutions can be processed by ion membrane technology to obtain sodium hydroxide and sulfuric acid as usable products.

The starting sodium sulfate solutions contain typically about 150 g/l to about 200 g/l $Na_2SO_4$/l. The calcium and magnesium level can vary. The solutions can be from any source. However a typical source of these solutions is the raffinates resulting from the liquid-liquid exchange processes for extracting tungsten from sodium tungstate solutions at a pH of about 2 by amine extracting agents. These raffinates are usually at a pH of about 1 to about 3.

The sodium sulfate solution is first adjusted to a pH of about 11 to about 13 and preferably about 12 to about 13 with sodium hydroxide. The usual method of adjusting the pH is to add the sodium hydroxide in the form of a concentrated solution, for example as a 17N solution. The solution is allowed to agitate during the pH adjustment to allow a precipitate to form which contains a portion of the magnesium and calcium predominately as magnesium hydroxide and calcium hydroxide respectively.

The precipitate is then removed from the resulting partially purified solution by standard methods such as filtration.

The partially purified solution is then contacted with a polystyrene divinyl benzene copolymer chelating cation exchange resin having an aminophosphonic functional group and having sodium as the exchangeable cation, to remove essentially all of the magnesium and the calcium from the partially purified sodium sulfate solution. The preferred resin is manufactured by Rohm and Haas under the name of Duolite C-467. The purified solution contains less than about 1 mg/l each of Mg and Ca. This purified solution can then be processed to derive chemical products, instead of being disposed of as waste material as had to be done prior to the present invention.

To more fully illustrate this invention, the following nonlimiting example is presented.

EXAMPLE

Sodium sulfate solution which is a raffinate from a tungsten solvent extraction system is used. The composition of this solution is about 177.6 g $Na_2SO_4$/l, about 630 mg Mg/l, and about 3.2 mg Ca/l. The pH is about 1.6. To about 200 ml aliquots of this solution is added 17N sodium hydroxide solution with agitation to the desired pH. The pH adjusted solutions are allowed to stand for about 1 hour and is then filtered. The filtrate is analyzed for Mg and Ca. The results are summarized in the Table.

TABLE

| pH | Mg mg/l | Ca mg/l |
|---|---|---|
| Starting solution | 630 | 3.4 |
| 10.1 | 530 | 3.4 |
| 10.4 | 340 | 3.9 |
| 10.8 | 97 | 3.4 |
| 11.0 | 96 | 3.1 |
| 11.8 | 35 | 2.8 |
| 12.0 | 3.4 | 2.3 |

The sodium sulfate solution at pH of 12.0 is contacted with Duolite C-467 chelating cation exchange resin which is composed of polystyrene divinyl benzene copolymer with aminophosphonic functional groups, the resin being in the sodium form, to remove the bulk of the Mg and Ca. The solution treated with the resin contains less than about 1 mg/l each of Mg and Ca. The resulting purified sodium sulfate solution can be processed to obtain product chemicals thereby eliminating a waste disposal problem.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for removing magnesium and calcium from sodium sulfate solutions, to render said solutions suitable for membrane processing, said method comprising:

(a) adjusting the pH of said solutions to about 11 to about 13 with sodium hydroxide to form a precipitate containing the bulk of said magnesium and said calcium;

(b) removing said precipitate from the resulting partially purified sodium sulfate solution; and (c) contacting said partially purified sodium sulfate solution with a polystyrene divinyl benzene copolymer chelating cation exchange resin having an aminophosphonic functional group and having sodium as the exchangeable cation, to remove essentially all of said magnesium and said calcium from said partially purified sodium sulfate solution.

2. A method of claim 1 wherein said pH is about 12 to about 13.

* * * * *